(12) United States Patent
Yuri

(10) Patent No.: US 7,930,882 B2
(45) Date of Patent: Apr. 26, 2011

(54) COGENERATION SYSTEM

(75) Inventor: Nobuyuki Yuri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 12/256,711

(22) Filed: Oct. 23, 2008

(65) Prior Publication Data

US 2009/0107128 A1    Apr. 30, 2009

(30) Foreign Application Priority Data

Oct. 25, 2007  (JP) ................................. 2007-278185

(51) Int. Cl.
| | |
|---|---|
| *F01N 3/02* | (2006.01) |
| *F01N 5/02* | (2006.01) |
| *B60H 1/02* | (2006.01) |
| *F24D 1/04* | (2006.01) |
| *F24D 5/00* | (2006.01) |
| *B60L 1/02* | (2006.01) |
| *F01K 15/00* | (2006.01) |
| *F01K 17/02* | (2006.01) |
| *F02C 6/00* | (2006.01) |
| *F02C 6/18* | (2006.01) |

(52) U.S. Cl. .............................. 60/320; 237/12.1; 290/2
(58) Field of Classification Search .................... 60/320; 237/12.1

See application file for complete search history.

(56) References Cited

U.S. PATENT DOCUMENTS

| | | | | |
|---|---|---|---|---|
| 4,441,902 | A * | 4/1984 | Jardine | .................. 62/238.6 |
| 7,040,544 | B2 * | 5/2006 | Guyer | .................. 237/12.1 |

FOREIGN PATENT DOCUMENTS

JP          08-004586 A      1/1996

* cited by examiner

*Primary Examiner* — Thomas E Denion
*Assistant Examiner* — Christopher Jetton
(74) *Attorney, Agent, or Firm* — Westerman, Hattori, Daniels & Adrian, LLP

(57) ABSTRACT

A cogeneration system that allows an engine to be continuously operated even when there is no demand for hot feedwater. The system comprises a hot water tank for storing hot water heated from cold water by heat released by an engine that drives a generator. When the heat of the water in the hot water tank exceeds a predetermined temperature, a control is performed so that a drain valve is opened and the hot water in the tank is released.

4 Claims, 3 Drawing Sheets

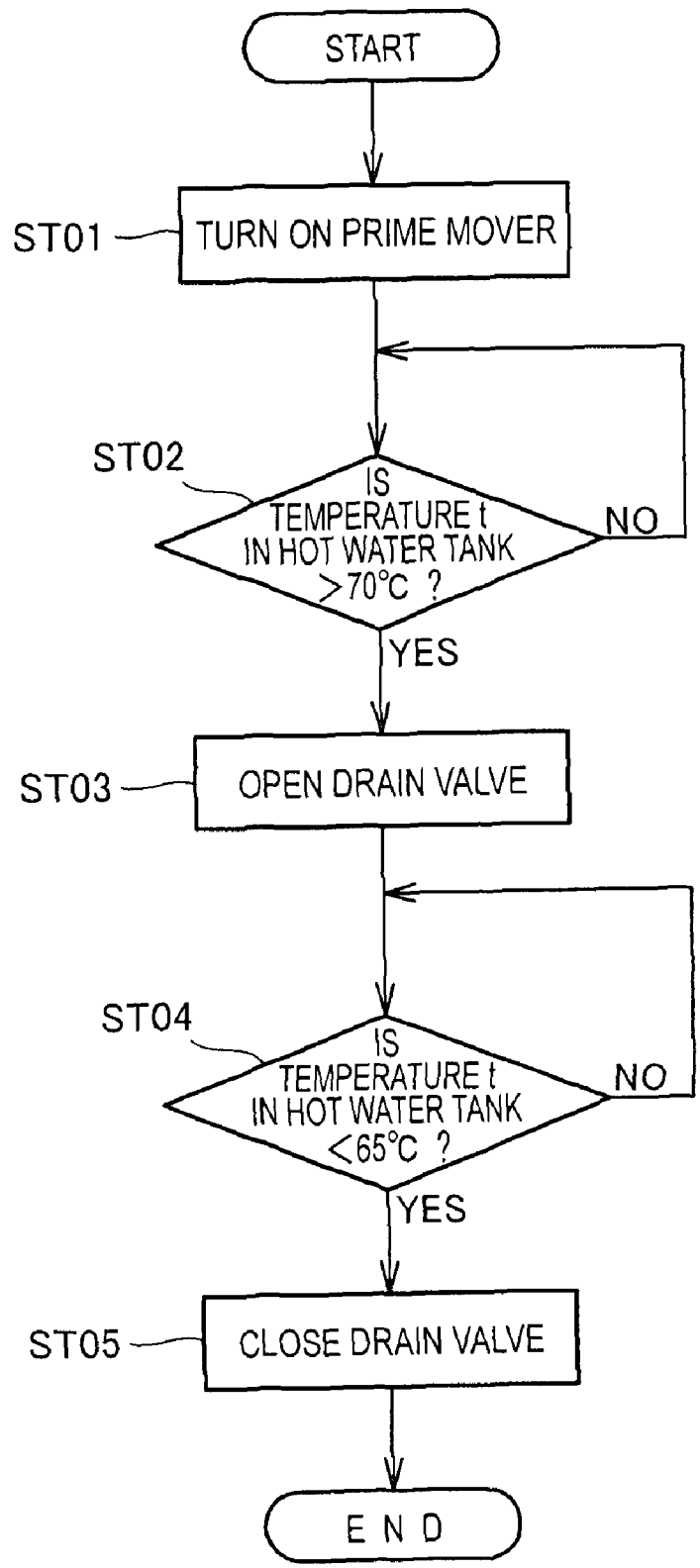

COGENERATION SYSTEM

FIELD OF THE INVENTION

The present invention relates to an improvement to a cogeneration system in which a generator driven by an engine is used to produce electrical energy, and cold water is turned into hot water using heat released by the engine.

BACKGROUND OF THE INVENTION

There are known cogeneration systems in which a generator driven by an engine is used to produce electrical energy, and an exhaust heat exchanger is used to turn cold water into hot water using heat released by the engine, as disclosed in Japanese Patent Application Laid-Open Publication No. 08-004586 (JP 08-004586 A).

The disclosed cogeneration system is provided with a gas engine, a generator driven by the gas engine, and a hot water heat exchanger ("exhaust heat exchanger" hereunder) for turning cold water into hot water using heat released by the gas engine.

A basic method used for operating and controlling a cogeneration system involves setting an operation pattern of the cogeneration system according to the amount of hot feedwater needed on the output side.

According to this method, when there is little or no demand for hot feedwater, a gas engine 1 is stopped so that the temperature thereof does not reach or exceed a predetermined value. Specifically, according to this method, supplying hot water is prioritized over supplying electricity. However, during power outage, for example, it has been necessary to attach a separate cooling unit to the gas engine and cool the gas engine, e.g., in order to provide a continuous supply of electrical energy.

SUMMARY OF THE INVENTION

An object of the present invention is to provide a cogeneration system that allows continuous operation of an engine even when there is little or no demand for hot feedwater.

According to the present invention, there is provided a cogeneration system which comprises: an engine; a generator for generating electrical energy, the generator being driven by the engine; an exhaust heat exchanger for converting cold water into hot water using exhaust heat released from the engine as a heat source; a hot water tank for storing hot water whose temperature has been increased by heat released from the engine, the hot water tank being linked to the exhaust heat exchanger; a drain valve for releasing the hot water to the exterior as a result of being opened, the drain valve being connected to a hot water supply outlet of the hot water tank; and a control part for performing a control such that the drain valve opens when the heat of the water in the hot water tank exceeds a predetermined temperature.

When the heat of the water in the hot water tank exceeds a predetermined temperature, the drain valve opens, and the hot water is released; therefore, the heat of the water in the hot water tank will not exceed a predetermined temperature. Since the temperature of the water in the hot water tank will not exceed a predetermined value, the temperature of the exhaust heat exchanger will not exceed a predetermined value.

As long as the temperature of the exhaust heat exchanger does not exceed the predetermined value, it is thus unnecessary to stop the engine due to an increase in the temperature of the exhaust heat exchanger, and continuous operation becomes possible. Furthermore, a separate cooling unit does not have to be attached to the engine. Therefore, according to the constitution of the present invention, even when there is little or no demand for hot feedwater, the engine can be operated continuously without a separate cooling unit having to be attached thereto.

Preferably, a hot water circulation pipe for returning hot water in the hot water tank to the hot water tank after the hot water has been led from the tank to the exterior is connected to the hot water tank while a hot air heater for warming external air using the hot water as a heat source is disposed along the hot water circulation pipe. Since the hot air heater can be used advantageously, the cogeneration system can thus be used more effectively.

Desirably, auxiliary heating means for reheating hot water is provided on the hot water circulation pipe. Having the auxiliary heating means provided to the hot water circulation pipe enables the hot water circulation pipe to be heated even if the temperature of the hot water tank is low, allowing the predetermined capability of the hot air heater to be maintained. Specifically, even when the temperature of the hot water tank is low, there is no restriction that the hot air heater cannot be used, and the predetermined heating capability can be obtained.

In a preferred form, the hot air heater has a blower for blowing air, a latent heat exchanger and a sensible heat exchanger that are disposed downstream of the flow of air from the blower, and a burner for sending heated air to the sensible heat exchanger.

BRIEF DESCRIPTION OF THE DRAWINGS

A preferred embodiment of the present invention will be described in detail below, by way of example only, with reference to the accompanying drawings, in which:

FIG. 3 is a flowchart showing a switching function of a drain valve of FIG. 1.

DETAILED DESCRIPTION OF THE PREFERRED EMBODIMENT

Figure 1:
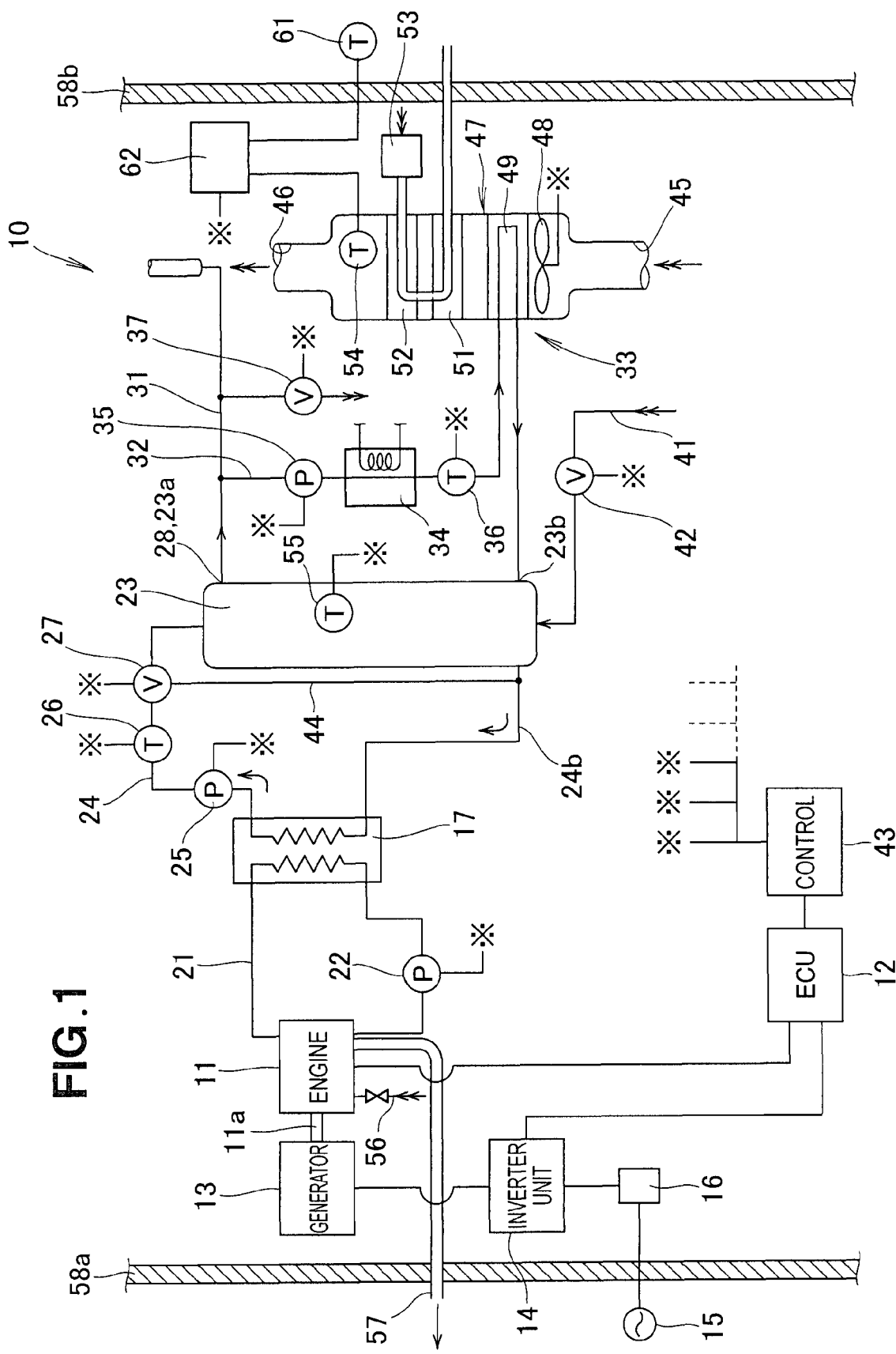
FIG. 1 is a block diagram showing the arrangement of a cogeneration system according to the present invention.

Referring to FIG. 1, a cogeneration system 10 has an engine 11 used as a prime mover, an ECU 12 for controlling the engine 11, and a generator 13. The generator 13 is connected on an output shaft 11a of the engine 11, and electrical energy is generated by the drive of the engine 11.

An inverter unit 14 is connected on an output terminal of the generator 13. A changeover switch 16 is provided between the inverter unit 14 and an external commercial power supply 15, and stops the generated electrical energy from being supplied to the external commercial power supply 15 outside of predetermined periods.

An exhaust heat exchanger 17 increases the temperature of water using heat released by the engine 11. A cooling water circulation channel 21 links the engine 11 and the exhaust heat exchanger 17, and cooling water for cooling the engine 11 is circulated therethrough. A cooling water circulation pump 22 is disposed along the cooling water circulation channel 21, and pumps the cooling water heated by the exhaust heat exchanger 17 to the engine 11.

A hot water tank 23 retains hot water that has been subjected to heat exchange by the exhaust heat exchanger 17. A hot water circulation channel 24 links the exhaust heat exchanger 17 and the hot water tank 23, and is used to circulate hot water. A hot water pump 25, a temperature sensor 26, and a temperature adjustment valve 27 are disposed along the hot water circulation channel 24. A bypass path 44 connects a return pipe 24b for returning hot water from the hot water tank 23 to the exhaust heat exchanger 17, and the temperature adjustment valve 27. When the hot water in the hot water circulation channel 24 reaches a predetermined temperature, e.g. 70° C., the temperature adjustment valve 27 is gradually opened, and the hot water starts to feed into an upper part of the hot water tank 23. The temperature adjustment valve 27 opens increasingly wider as the temperature of the water increases.

A hot water output pipe 31 is attached to a hot feedwater outlet 28 provided on the hot water tank 23, and is used to convey hot water to the exterior.

A hot water circulation pipe 32 is used to return hot water output from the hot feedwater outlet 28 on one side 23a of the hot water tank 23 to the other side 23b of the hot water tank 23. A hot air heater 33 is disposed along the hot water circulation pipe 32.

Auxiliary heating means 34 is disposed along the hot water circulation pipe 32 upstream from the hot air heater 33, and is used to heat the hot water until a desired temperature is reached.

A hot water output pump 35 is provided in the hot water circulation pipe 32 between the hot feedwater outlet 28 of the hot water tank 23 and the auxiliary heating means 34. A temperature sensor 36 is provided in the hot water circulation pipe 32 upstream of the return outlet 23b of the hot water tank 23.

A drain valve 37 is connected to the hot feedwater outlet 28 via the hot water output pipe 31, and is opened to release hot water to an exterior.

Water is fed to the hot water tank 23 via a feedwater path 41. A feedwater valve 42 is disposed along the feedwater path 41, and is opened when necessary.

A control part 43 opens and closes the drain valve 37, and also controls a variety of other operations in the cogeneration system 10.

The hot air heater 33 is provided with a case 47 having an air inlet 45 and outlet 46, a blower 48 disposed in the case 47 and used for blowing air; a heat exchanger 49 provided downstream in the direction the air flows from the blower 48, and disposed along the hot water circulation pipe 32; a latent heat exchanger 51 and a sensible heat exchanger 52 that are disposed further downstream than the heat exchanger 49 in the direction of the flow of air from the blower 48; and a burner 53 for sending heated air to the sensible heat exchanger 52. Reference numeral 54 denotes a temperature sensor.

Combustion gas produced by the burner 53 passes through the sensible heat exchanger 52 and the latent heat exchanger 51 before being released to the outside. Air that has passed through the sensible heat exchanger 52 and the latent heat exchanger 51 gets heated by the blower 48 disposed in the case 47.

The burner 53 is activated when room temperature is substantially lower than a set value or when room temperature has not risen even after a predetermined period of time has elapsed.

A return pipe through which cold air returns from individual rooms is connected to the air inlet 45, and a delivery pipe for delivering hot air to the rooms is connected to the air outlet 46. In the drawing, reference numeral 55 designates a temperature sensor disposed in the hot water tank, reference numeral 56 designates a gas pipe for supplying gas to the engine 11, reference numeral 57 designates an exhaust pipe for discharging exhaust gases, and reference numerals 58a, 58b designate walls of a building. Assuming the inner side of the walls 58a, 58b is referred to as "inside", and the exterior side of the walls 58a, 58b constitutes the "outside", reference numeral 61 designates a temperature sensor disposed outside, and reference numeral 62 designates a remote control for setting an inside temperature.

Specifically, the hot water tank 23 for storing hot water, the temperature of which having been increased by heat released from the engine 11, is connected to the exhaust heat exchanger 17, which transmits heat released from the engine 11 to cold water and outputs hot water. The drain valve 37, which opens to release hot water to the exterior, is connected via the hot water output pipe 31 to the hot feedwater outlet 28 of the hot water tank 23, and when the hot water in the hot water tank 23 exceeds a predetermined temperature, the control part 43 performs a control to open the drain valve 37.

The ·X· marks in the drawing indicate connections between the control part 43 and each of the devices.

The hot water circulation pipe 32 through which hot water from the hot water tank 23 is led to the exterior and returned is connected to the hot water tank 23, and the hot air heater 33, which warms external air using the hot water as a heat source, is disposed along the hot water circulation pipe 32. The hot air heater 33 can thus be advantageously used. Therefore, the cogeneration system 10 can be used more effectively.

The auxiliary heating means 34 for keeping the hot water hot is provided to the hot water circulation pipe 32. Having the auxiliary heating means 34 provided upstream from the hot air heater 33 along the hot water circulation pipe 32 enables the hot water circulation pipe 32 to be heated even if the temperature of the hot water tank 23 is low, allowing the predetermined heating capability of the hot air heater 33 to be maintained.

Figure 2:
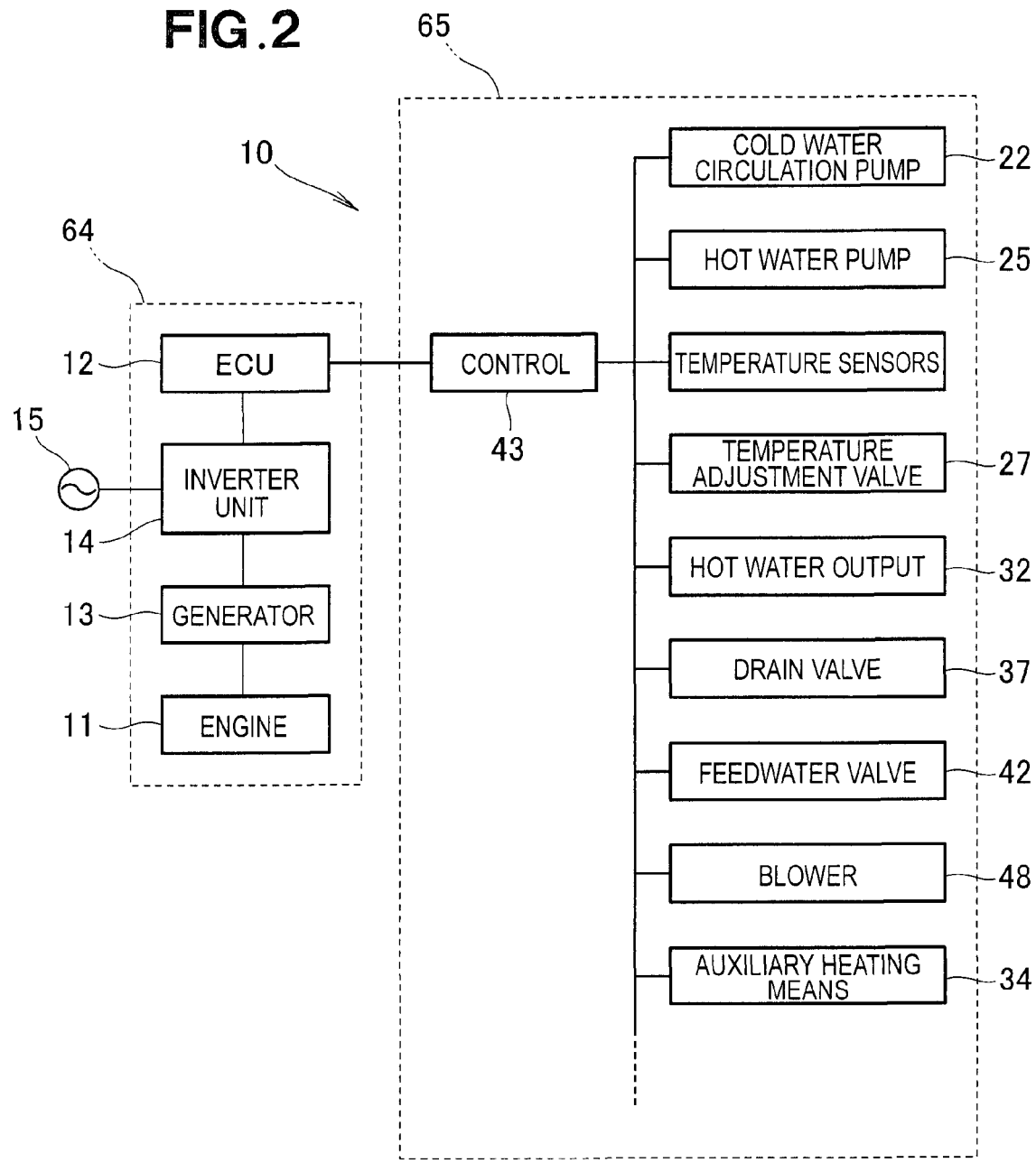
FIG. 2 is a block diagram of the control performed in the cogeneration system of FIG. 1.

As shown in the FIG. 2, the cogeneration system 10 according to the present embodiment comprises a power generating unit 64 and a hot feedwater unit 65.

The electricity-outputting unit 64 is provided with the engine 11; the generator 13 driven by the engine 11; and the inverter unit 14. The inverter unit 14, which is connected to an output terminal of the generator 13, converts the frequency and voltage of the generator 13 for output, and has a starter drive function for switching the generator 13 to function as a starter. An output of the inverter unit 14 is connected to the external commercial power supply 15. When the generated energy has reached a predetermined value, the output is connected to the changeover switch 16 (FIG. 1), and electrical energy is supplied to the external commercial power supply 15.

The hot feedwater unit 65 includes the control part 43. The cold water circulation pump 22; the hot water pump 25; the various temperature sensors 26, 36, 55; the temperature adjustment valve 27, the hot water output pump 35, the drain valve 37, the feedwater valve 42, the blower 48, and the auxiliary heating means 34 are connected to the control part 43.

The control part 43 is connected to an ECU 12, and to each of the pumps, valves, and temperature sensors that are disposed in the system (shown by the ·X· mark in the drawing), and performs a variety of controls over each of the pumps and valves.

A control for opening and closing the drain valve 37 shown in FIGS. 1 and 2 will be described with reference to the flowchart shown in FIG. 3.

As shown in FIG. 3, a prime mover is started in Step ("ST" hereunder) 01. Specifically, the engine 11 in FIG. 1 is started (turned on). In ST02, a temperature (t) of the hot water in the hot water tank 23 is measured by the temperature sensor 55, and the control part 43 monitors whether or not the temperature of the hot water has exceeded 70° C.

If it has been determined in ST02 that the temperature (t) of the hot water has exceeded 70° C., the drain valve 37 is opened in ST03.

In ST04, the temperature (t) of the hot water in the hot water tank 23 is measured by the temperature sensor 55, and a decision is made as to whether or not the temperature of the hot water is less than 65° C.

If it has been determined that the temperature (t) of the hot water is less than 65° C., the control part 43 performs a control to close the drain valve 37 in ST05.

The flow of steps for controlling the opening and closing of the drain valve 37 then ends.

Specifically, the drain valve 37 that opens to release hot water to the exterior is connected to the hot feedwater outlet 28 of the hot water tank 23, and when the heat of the water in the hot water tank 23 exceeds the predetermined value of 70° C., a control is performed to open the drain valve 37, and the hot water is released to the exterior. Therefore, the heat of the water in the hot water tank 23 will not exceed a predetermined value, and the temperature of the exhaust heat exchanger 17 will not exceed a predetermined value.

As long as the temperature of the exhaust heat exchanger 17 does not exceed the predetermined value, it is thus unnecessary to stop the engine 11 due to an increase in the temperature of the exhaust heat exchanger 17, and the engine 11 can be operated continuously. Therefore, the generator 13 can continuously produce electrical energy. Furthermore, a separate cooling unit does not have to be attached to the engine 11.

According to the constitution of the present invention, even when there is little or no demand for hot feedwater, the engine 11 can be operated continuously without a separate cooling unit having to be attached thereto.

In the present embodiment, the predetermined temperature value is set to 70° C.; however, values lower or higher than this are also possible.

In the present invention, the hot water circulation pipe that is connected to the hot water tank and the hot air heater connected to the hot water circulation pipe need not be provided.

Furthermore, in the present invention, the auxiliary heating means provided in the hot water circulation pipe need not be provided.

The present invention is a cogeneration system that simultaneously generates electricity and supplies hot water, and preferably a cogeneration system in which supplying hot water is prioritized over supplying electricity.

Obviously, various minor changes and modifications of the present invention are possible in light of the above teaching. It is therefore to be understood that within the scope of the appended claims the invention may be practiced otherwise than as specifically described.

What is claimed is:

1. A cogeneration system comprising:
an engine,
a generator for generating electrical energy, the generator being driven by the engine;
an exhaust heat exchanger for converting cold water into hot water using exhaust heat released from the engine as a heat source;
a hot water tank communicating with the exhaust heat exchanger, for storing hot water whose temperature has been increased by heat released from the engine, the hot water tank having a hot water supply outlet from which the hot water is supplied to an exterior;
a hot water circulation channel which links the exhaust heat exchanger and the hot water tank for circulating the hot water through the exhaust heat exchanger, the hot water circulation channel having a return passage for returning the hot water from the hot water tank to the exhaust heat exchanger;
a temperature adjustment valve disposed in the hot water circulation channel, downstream of the exhaust heat exchanger;
a bypass path connecting the temperature adjustment valve and the return passage of the hot water circulation channel, wherein the temperature adjustment valve is capable of being gradually opened when the hot water in the hot water circulation channel reaches a first predetermined temperature, thereby allowing the hot water to flow into an upper part of the hot water tank, the temperature adjustment valve being configured to open increasingly wider as the temperature of the hot water in the hot water circulation channel increases;
a hot water supply passage connected to the hot water supply outlet of the hot water tank for supplying the hot water from the hot water tank to the exterior;
a drain valve disposed in the hot water supply passage and being capable of being opened to release the hot water to the exterior; and
a control part for performing a control such that the drain valve opens when the heat of the water in the hot water tank exceeds a second predetermined temperature.

2. The cogeneration system of claim 1, wherein a hot water circulation pipe is connected between the hot water supply passage and the hot water tank for returning hot water in the hot water tank to the hot water tank after the hot water has been led from the hot water tank to the exterior, and a hot air heater for warming external air using the hot water as a heat source is disposed along the hot water circulation pipe.

3. The cogeneration system of claim 2, wherein auxiliary heating means for reheating the hot water is provided on the hot water circulation pipe.

4. The cogeneration system of claim 2, wherein the hot air heater has a blower for blowing air, a latent heat exchanger and a sensible heat exchanger that are disposed downstream of a flow of air from the blower; and a burner for sending heated air to the sensible heat exchanger.

* * * * *